Patented Jan. 26, 1937

2,068,796

UNITED STATES PATENT OFFICE 2,068,796

CONDENSATION PRODUCT OF LOW SULPHONATION APPLICABLE AS A SIZE

Charles Graenacher and Richard Sallmann, Basel, Switzerland, assignors to the firm of Society of Chemical Industry in Basle, Basel, Switzerland No Drawing. Application January 9, 1934, Serial No. 705,956. In Switzerland January 11, 1933

3 Claims. (Cl. 87—12)

The present invention relates to new condensation products which possess such properties that they can be used as sizes. The new products are obtained by condensing approximately molecular proportions of unsaturated oils capable of polymerization, such as linseed oil, poppy-seed oil, wood oil, castor oil or the like with easily condensable phenols of the benzene and naphthalene series of aromatic hydroxy compounds, such as not negatively substituted monohydric or polyhydric phenols and naphthols, in the presence of concentrated sulphuric acid. The concentrated sulphuric acid used as condensing agent also effects sulphonation, the sulphonation being carried only so far that the resulting products, when neutralized with alkalies or ammonia, are insoluble in organic solvents, such as benzene, but are soluble in a little water to a clear solution which on dilution with more water becomes turbid and changes into a viscous emulsion. These emulsions have considerable adhesive power and when allowed to stand, even when strongly diluted, become jellified. This emulsion is very useful for producing sizes. By these peculiar solubility conditions the new condensation products distinguish themselves from all condensation products up to now described and known which have been obtained by sulphonating condensation products of unsaturated oils with aromatic compounds.

The new products, in the form of their alkali salts or ammonium salts, form viscous masses which on heating as well as on addition of little water become thinly liquid. They are characterized by the fact that they have retained the adhesive properties of the products formed by polymerization of the starting materials. This applies particularly to the products from linseed oil. As already stated, the valuable properties of the new products are also to be attributed to their incomplete sulphonation. The use of easily condensable aromatic hydroxy-compounds is also of importance for the manufacture of the new products, and compounds, such as phenol itself and the homologues and analogues thereof, for example the cresols, the dihydroxy-benzenes and dihydroxy-cresols and the monoalkyl ethers thereof, particularly the resorcinol, further naphthols and dihydroxynaphthalenes, are particularly suitable for this purpose.

These products, belonging both to the benzene or naphthalene series, which, in contradistinction to the difficultly condensable halogenated or nitrated or sulphonated phenols and naphthols, lead to good results, are characterized here by the expression easily condensable phenols.

The condensation connected with the easy sulphonation may be conducted by treating the approximately molecular mixture of the oil and the phenol with a comparatively small quantity of sulphuric acid, for example 1½ to 2½ moles, at the beginning at low temperature, for instance 20 to 30° C., and in order to complete the reaction the mixture is heated for some time at a somewhat raised temperature, as indicated in the examples. It is advantageous to carry out the condensation in presence of solvents or liquid diluents. Such solvents are solvents which, on the one part, dissolve the initial products and which, on the other part, are little or not affected by the sulphuric acid under the conditions existing here. Such solvents are, for example, benzene, tetrachlorethane, toluene, trichlorethylene, dichlorbenzene, and so forth.

The new products may be used in the textile and allied industries as auxiliary substances, for example as wetting agents, as emulsifiers and for the making of sizes and finishes. They may be used alone or in admixture with other products, such as wetting agents, emulsifiers, softening agents, washing agents, starch, albumin or emulsions of fats, wax or paraffin; in particular, with those of these materials which are used for making sizes and finishes.

The following examples illustrate the invention, the parts being by weight:—(unless otherwise stated)—

Example 1

20 parts of resorcinol are dissolved in 100 parts of linseed oil with aid of heat. The solution is then cooled and mixed with 50 parts of tetrachlorethane. Into the solution thus obtained and at a temperature of 5 to 10° C. there are run, with constant stirring and cooling, 20 parts of sulphuric acid monohydrate, the rate of flow being such that the temperature of the mixture does not rise above 20° C. When all the sulphuric acid has been introduced into the mixture and uniformly distributed therein the cooling of the mixture is interrupted whereupon the condensation continues with considerable generation of heat. By suitably cooling care is taken that the temperature of the mixture does not rise above 70° C. When there is no more evolution of heat care is taken, by externally heating, to retain the temperature of the mass at 70° C., and while constantly stirring, the temperature is raised in the course of 2 hours to 90° C. The viscosity of the mass rises continually and after the said lapse of time the mass is a brown red, clear, extremely tough, gummy product which cannot be further stirred. After addition of 200 parts of hot water the mixture can be stirred to form a homogeneous emulsion into which steam is conducted for eliminating the tetrachlorethane. When this operation is complete, the condensation product is separated, if necessary with addition of common salt, from the aqueous phase and neutralized by means of 35–40 parts of ammonia, whereby a clear, highly viscous brown red mass is obtained. This product may be diluted as desired by stirring it with warm water, so that more or less viscous, stable, milky emulsions are obtained.

Example 2

A mixture consisting of 20 parts of resorcinol, 100 parts of linseed oil and 25 parts of tetrachlorethane is condensed and sulphonated as described in Example 1 by addition of 40 parts of sulphuric acid monohydrate. As soon as no further heat is evolved the mixture is heated and stirred for 1 hour at 60–70° C. There is thus produced a viscous brown red mass which can still be stirred; this is then mixed with 200 parts of water to form a thick fluid emulsion which, on standing or addition of a salt, suffers separation of the aqueous phase, and is correspondingly capable of being washed. After neutralization with ammonia the product is clearly soluble in water, if necessary with the addition of a little ammonia.

Example 3

A mixture consisting of 20 parts of resorcinol, 100 parts of poppy-seed oil and 50 parts of tetrachlorethane is condensed as described in Example 1 by addition of 40 parts of sulphuric acid monohydrate and, after no further generation of heat occurs, the mixture is stirred for 3 hours at 60–70° C. There is produced a clear brown red viscid mass, which is worked up as described in Example 2, the product having properties similar to those of the product of that example.

Example 4

In an emulsion made by stirring water containing 50 grams per litre of the product obtainable as described in Example 1 copper artificial silk is immersed in the form of hanks for 15 minutes, then wrung out, centrifuged and dried; the threads are well closed and soft. This sizing can be readily washed out with warm water, if necessary with the addition of a small proportion of ammonia and soap.

Example 5

In an emulsion which has been made by stirring water containing 50 grams per litre of the product obtainable as described in Example 4, copper artificial silk is immersed in the form of hanks during 15 minutes, then wrung out, centrifuged and dried. The threads are well closed and soft. This sizing may be washed out with warm water, if necessary with the addition of a small proportion of ammonia.

What we claim is:—

1. A process for the manufacture of condensation products applicable as sizes, consisting in treating below about 20° C. approximately molecular proportions of linseed oil and resorcinol with such quantities of sulphuric acid which per mol of resorcinol amount to 1½ to 2½ mols of sulphuric acid, carefully heating the resultant mass to temperatures lying between 60–90° C. until a viscous brown-red mass is produced, and then, for the purpose of separating the reaction product, treating the resultant sulphonated mixture with water.

2. As a size, an incompletely sulphonated condensation product of linseed oil and an easily condensable phenol, said product being produced by treating below about 20° C. approximately molecular proportions of the linseed oil and phenol with 1½–2½ molecular proportions of sulphuric acid, carefully heating the resultant mass to a temperature of 60–90° C. until a viscous mass is produced, and then separating the reaction product by treating the resultant sulphonated mixture with water.

3. As a size, an incompletely sulphonated condensation product of linseed oil and resorcinol, said product being produced by treating below about 20° C. approximately molecular proportions of the linseed oil and resorcinol with 1½–2½ molecular proportions of sulphuric acid, carefully heating the resultant mass to a temperature of 60–69° C. until a viscous mass is produced, and then separating the reaction product by treating the resultant sulphonated mixture with water.

CHARLES GRAENACHER.
RICHARD SALLMANN.